Patented June 17, 1952

2,600,845

UNITED STATES PATENT OFFICE 2,600,845

LIQUID FILTER

Robert E. Carrigan, Saylesville, R. I., assignor to Union Wadding Company, a corporation of Rhode Island No Drawing. Application March 13, 1947, Serial No. 734,543

4 Claims. (Cl. 210—203)

This invention relates to a filter of the type designed primarily for use in filtering milk on the farm. It is more especially concerned with sheets or disks used in filters for this purpose although obviously it may be used for filtering other liquids.

As milk is collected in pails or other containers, it is usually poured through a filter disk supported in a metal strainer which fits into the top of a can designed to be sent to the pasteurizing machine or some receiving center. The object of the filtering operation performed at this time is to remove such dirt as is collected incidental to the milking operation.

A satisfactory filter disk should have the qualities of permitting the filtrate to pass through rapidly even where large volumes are concerned without slowing down or clogging. The disk should remove all visible dirt or sediment. The disk should be relatively free from bacteria or from contaminating material of any kind and the disk should be convenient to use.

The common commercial forms of filter disks which have been largely used for this purpose have been sized with starch, dextrine or the like to give them cohesion and to smooth the outer surfaces so that the disks can be easily separated. The starch is readily water soluble and thus the filter disk, which is sized with starch, has very little wet strength. To give the filter added strength, gauze is placed upon the outer surfaces of the unwoven fibers in order to hold the layers together. The gauze serves its purpose satisfactorily, but it is expensive. More recently, attempts have been made to size the outer of a plurality of layers, and sometimes the inner layers as well, by a waterproof resin, but in each instance care is exercised so that the resin will be applied to the fibers in discrete particles with the interstices between the points of contact of the fibers free of the bonding substance, and while this arrangement has proved satisfactory so as to provide a filter which is less expensive to produce than where a gauze is used, the manner of applying the resin is expensive.

The present invention has for one of its objects to provide a water insoluble resin which may be applied in a more inexpensive manner, such as by transferring a film of the material to the fibers to be bonded together rather than by trying to apply this in discrete separated particles.

Another object of this invention is to provide a relatively rapid transmission of filtrate through the filter sheet.

Another object of this invention is to improve the wet strength of the filter.

Another object of this invention is to use a binder which may be cured at lower temperatures than binders which have heretofore been used.

Another object of this invention is to use an accelerator in the binder so that the curing may be obtained at a lower temperature.

Another object of this invention is to provide a filter which will not easily clog and one which is clean and convenient to use.

In proceeding with this invention, laps from a plurality of cards are assembled one superimposed upon the other until the desired thickness of sheet is provided, and then this sheet of a plurality of layers is passed over a cylindrical drum which rotates about half immersed in the liquid sizing or binder which is transferred to the surface of the sheet in a thin film, and then the material passes through an oven. The operations are repeated upon the other side of the sheet, after which filter disks of the desired diameter and shape are cut from the sheet of material.

The laps from the carding machine are all of the same material, and I have found that an equal mixture of India cotton, which is of a somewhat wiry nature, and domestic cotton, which is of a soft nature, are suitable for this purpose. The wiry India cotton has a function of preventing the softer fibers of the domestic cotton from matting down to an undesirable extent. There are other cottons, such as China cotton, of the more wiry nature which may be mixed with the soft domestic cotton in order that the above function may be had; but, because of the availability and the market conditions, the India cotton is now used. Usually from 8 to 10 layers or laps will provide substantially the desired thickness of the sheet material which is required. This condition depends somewhat upon the customer requirements. The number of laps will also depend somewhat upon the speed with which the accumulating conveyor for the several laps travels. Variations in this speed have an effect upon the finished thickness of the sheet produced.

The web thus formed of the superimposed layers or laps from the carding machines will be from 36" to 42" wide and will be passed over a drum which is from 12" to 15" in diameter and which drum rotates in a liquid binder to a depth of about one-half the diameter of the drum. Several smaller rolls hold the sheet into contact with the drum over a substantial length of its cylindrical surface so that the liquid binder which it picks up will be transferred to the sheet, and then this sheet thus treated will travel over a conveyor and into an oven about 90 feet long where it is subjected to a temperature of from 240° to 300° F. Its length of time in this oven is about two minutes. After emerging, the opposite surface of the sheet is given the same treatment and passed through an oven in the same way. The binder is applied by this smooth surfaced cylindrical drum as a film over the surface of the sheet which is transversely permeable to milk, and after the heat treatment, as looked at with the naked eye the surface appears substantially continuous. The film is very thin, being somewhat in the order of 2 to 3 thousandths of an inch and is from 6% to 8% of the weight of the sheet.

The binder is important, and I have found that a mixture of oxidized cornstarch and methylated melamine formaldehyde resin stands out as better than other binders for this purpose and, from tests which I have performed, is far better for wet strength and for filter properties than others I have tried. The starch and resin together is better than either of these substances alone. Cornstarch alone is water soluble and gives practically no wet strength. This resin alone, even in relatively large quantities, also does not give the required wet strength and has a rather soft handle; but, by the use of the two together, a very high wet strength is provided, and it is found that methylated melamine formaldehyde resin serves to prevent the starch from being soluble and thus maintains a very high wet strength throughout use. In accordance with a test which I have set up, the wet strength should be in excess of 500 grams to be satisfactory.

The resin product above referred to, however, requires curing or polymerization in an oven, and I have found an accelerator which enables this curing to be performed much more quickly and at a lower temperature than usual in the curing of a resin of this type. This curing is accelerated by the use of a mineral acid, such as sulphuric or hydrochloric acid, which is very unusual to use where cotton fibers are present as such acids are usually thought of as charring the cotton fibers. However, I find that this is a very satisfactory accelerator. The resin and starch take up any detrimental reaction that the acid might have, and the small contact that the film containing it has with the fibers is such that no charring or weakening of the fibers takes place. One of the most satisfactory binder baths which I have provided is as follows:

*Example I.—Wet strength 757 grams*

7.5 lbs. of oxidized cornstarch
3.6 lbs. of methylated melamine formaldehyde resin
.18 lb. of sulphuric acid, 66° Baumé

The above all being in 45 gallons of water.
The mixture is prepared as follows:
The starch is dispersed in 20 gallons of cold water and brought to a boil. The methylated melamine formaldehyde resin is mixed with 10 gallons of cold water and the sulphuric acid added, and then this solution is added to the 20 gallons of starch mixture and water is added to bring the volume up to 45 gallons. The binder is used at a temperature of 110° F. I find that by the use of this mixture a very satisfactory wet strength is provided, the strength lengthwise of the fibers being about three times that of the widthwise strength.

All of the following examples are in 45 gallons of water.

*Example II.—Wet strength 707 grams*

7.5 lbs. of starch
1.8 lbs. of methylated melamine formaldehyde resin
.09 lb. of sulphuric acid

*Example III.—Wet strength 750 grams*

6.5 lbs. of starch
3.0 lbs. of methylated melamine formaldehyde resin
.15 lb. of sulphuric acid I have also tried the substitution of pearl cornstarch for the oxidized cornstarch, and I have found that this usually gives a slightly greater strength than the oxidized cornstarch. This binder bath is as follows:

*Example IV.—Wet strength 790 grams*

7.5 lbs. of pearl cornstarch
1.8 lbs. of methylated melamine formaldehyde resin
.09 lb. of sulphuric acid I have also used gum arabic instead of cornstarch, and I find that this gives a greater strength than the cornstarch. This binder bath is as follows:

*Example V.—Wet strength 1200 grams*

7.5 lbs. of powdered gum arabic
1.8 lbs. of methylated melamine formaldehyde resin
.09 lb. of sulphuric acid By use of gum tragacanth, the wet strength has been materially increased. The formula is as follows:

*Example VI.—Wet strength 513 grams*

1.4 lbs. gum tragacanth
1.8 lbs. methylated melamine formaldehyde resin
.09 lb. of sulphuric acid In several instances, I have compared the wet strength and the filter properties with three commercial filters and have found that it is higher in wet strength and higher in flow transmission than the three commercial filters which I have been able to acquire.

From the above it will appear that some vegetable gums are the equivalent of starch. In summary of these examples, it will appear that the ratio of the methylated melamine formaldehyde resin to the starch varies from approximately one part of resin to from one to four parts of starch.

I claim:

1. A filter sheet comprising a series of superimposed layers of carded fibers, including a layer of unbonded fibers and additional unwoven layers at opposite sides of it having fibers which are bonded together by a film of thermo-setting water insoluble binder transversely permeable to milk, said binder being cured methylated melamine formaldehyde resin and starch varying in ratio from one part of resin to one to four parts of starch.

2. A filter sheet as in claim 1 wherein said binder is cured methylated melamine formaldehyde resin and starch the varying ratio being in the proportion of one part of resin to two parts of starch.

3. A process of increasing the wet strength of a filter sheet of unwoven cotton fibers which comprises applying to the surfaces of the sheet an aqueous solution of starch and a methylated melamine formaldehyde resin varying in ratio from one part of resin to one to four parts of starch and a mineral acid accelerator and then curing said product by heating for about two minutes from 240° F. to 300° F.

4. A process of increasing the wet strength of a filter sheet of unwoven cotton fibers which comprises applying to the surfaces of the sheet an aqueous solution of starch and a methylated melamine formaldehyde resin varying in ratio from one part of resin to one to four parts of starch and a sulphuric acid accelerator and then curing said product by heating for about two minutes from 240° F. to 300° F.

ROBERT E. CARRIGAN.

REFERENCES CITED

The following references are of record in the file of this patent:

UNITED STATES PATENTS

| Number | Name | Date |
| --- | --- | --- |
| 2,103,572 | Wells | Dec. 28, 1937 |
| 2,291,080 | Hofferbert | July 28, 1942 |
| 2,327,250 | Cruickshank | Aug. 17, 1943 |
| 2,345,543 | Wohnsiedler | Mar. 28, 1944 |
| 2,407,376 | Maxwell | Sept. 10, 1946 |
| 2,433,531 | Ryan | Dec. 30, 1947 |
| 2,437,082 | Davis | Mar. 2, 1948 |

OTHER REFERENCES

The use of Melamine Resins for Beater Wet Strength, by Charles S. Maxwell, April 1943, Pacific Pulp and Paper Industry.